United States Patent
Yoshio et al.

(10) Patent No.: US 6,310,625 B1
(45) Date of Patent: Oct. 30, 2001

(54) CLIP DISPLAY METHOD AND DISPLAY DEVICE THEREFOR

(75) Inventors: Hiroaki Yoshio; Kayoko Asai; Hitoshi Kato, all of Tokyo; Tomomi Kaga, Kawasaki, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/160,545

(22) Filed: Sep. 25, 1998

(30) Foreign Application Priority Data

Sep. 26, 1997 (JP) .................................................. 9-277996

(51) Int. Cl.[7] .................................................. G06T 17/00
(52) U.S. Cl. .................................................. 345/473
(58) Field of Search ................................. 345/471, 472, 345/473, 474

(56) References Cited

U.S. PATENT DOCUMENTS

| 5,177,513 | 1/1993 | Saito . |
| 5,442,744 | * 8/1995 | Piech et al. .......................... 345/473 |
| 5,521,841 | 5/1996 | Arman et al. . |
| 5,953,485 | * 9/1999 | Abecassis .............................. 386/68 |

FOREIGN PATENT DOCUMENTS

| 0660 249 | 6/1995 | (EP) . |
| 7-79404 | 3/1995 | (JP) . |

OTHER PUBLICATIONS

Hirotada Ueda et al., "Automatic Structure Visualization For Video Editing" Proceedings of the Conference on Human Factors Incomputing Systems.

Akutsu A et al., "Video Interface For Spattiotemporal Interactions Based on Multi–Dimensional Video Computing".

H. Ueda et al., "Impact: An Interactive Natural–Motion–Picture Dedicated Multimedia Authoring System".

Yoshinobu Tonomura et al., "Structured Video Computing".

Y. Tonomura et al., "Content Oriented Visual Interface Using Video Icons For Visual Database Systems".

Courtney, JD, "Automatic Video Indexing Via Object Motion Analysis".

B. Guensel et al., "Object–Based Video Indexing For Virtual Studio Productions".

N. Dimitrova et al., "Content–Based Video Retrieval By Example Video Clip".

Akutsu et al., "Video Indexing Using Motion Vectors".

* cited by examiner

Primary Examiner—Cliff N. Vo
(74) Attorney, Agent, or Firm—Israel Gopstein

(57) ABSTRACT

In a clip display method the contents of a clip are clearly displayed and can be used to facilitate the editing of a motion picture. Obtained by dividing a motion picture are displayed by-employing typical images of individual clips, a graphic representation 24 of the picture images for a motion picture is divided to provide segments corresponding to the ratio of the lengths of the clips to the overall length of the motion picture, and sequences of the separate graphic segments linked to typical are shown. The positions of the clips relative to the motion picture and the ratios of lengths of the individual clips to the overall length of the motion picture can be visually ascertained.

19 Claims, 20 Drawing Sheets

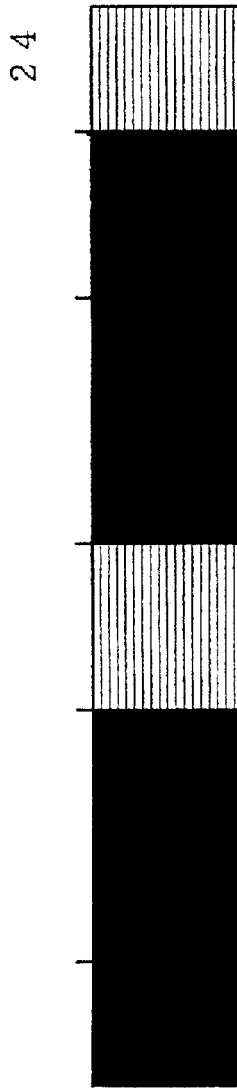
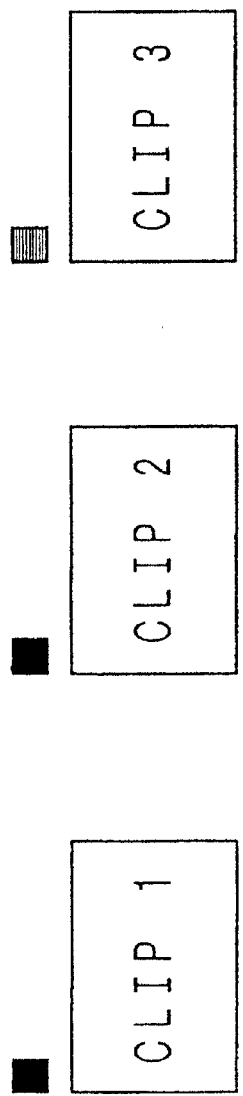
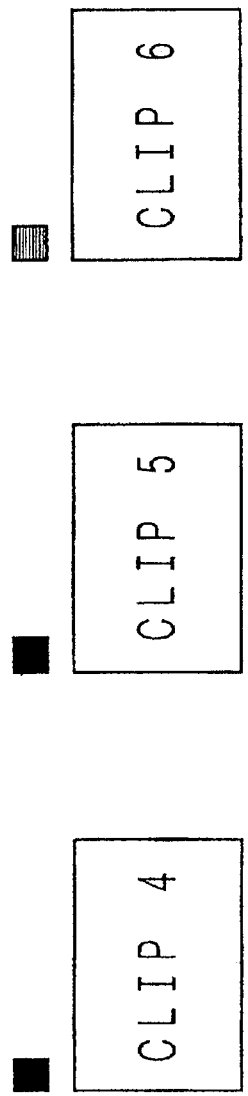
FIG. 1

ARRANGEMENT

FIG. 4
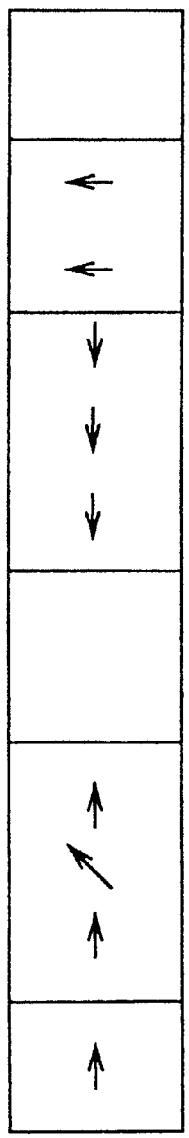
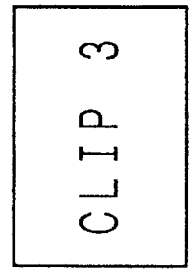
CLIP 2
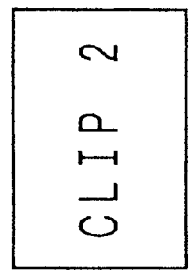
CLIP 1
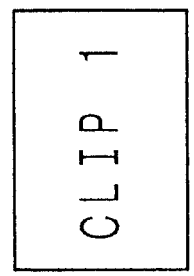
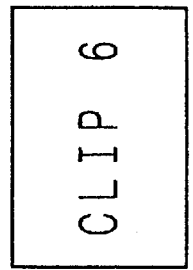
CLIP 3
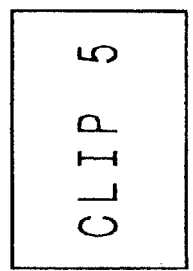
CLIP 6
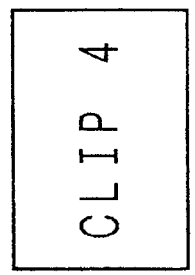

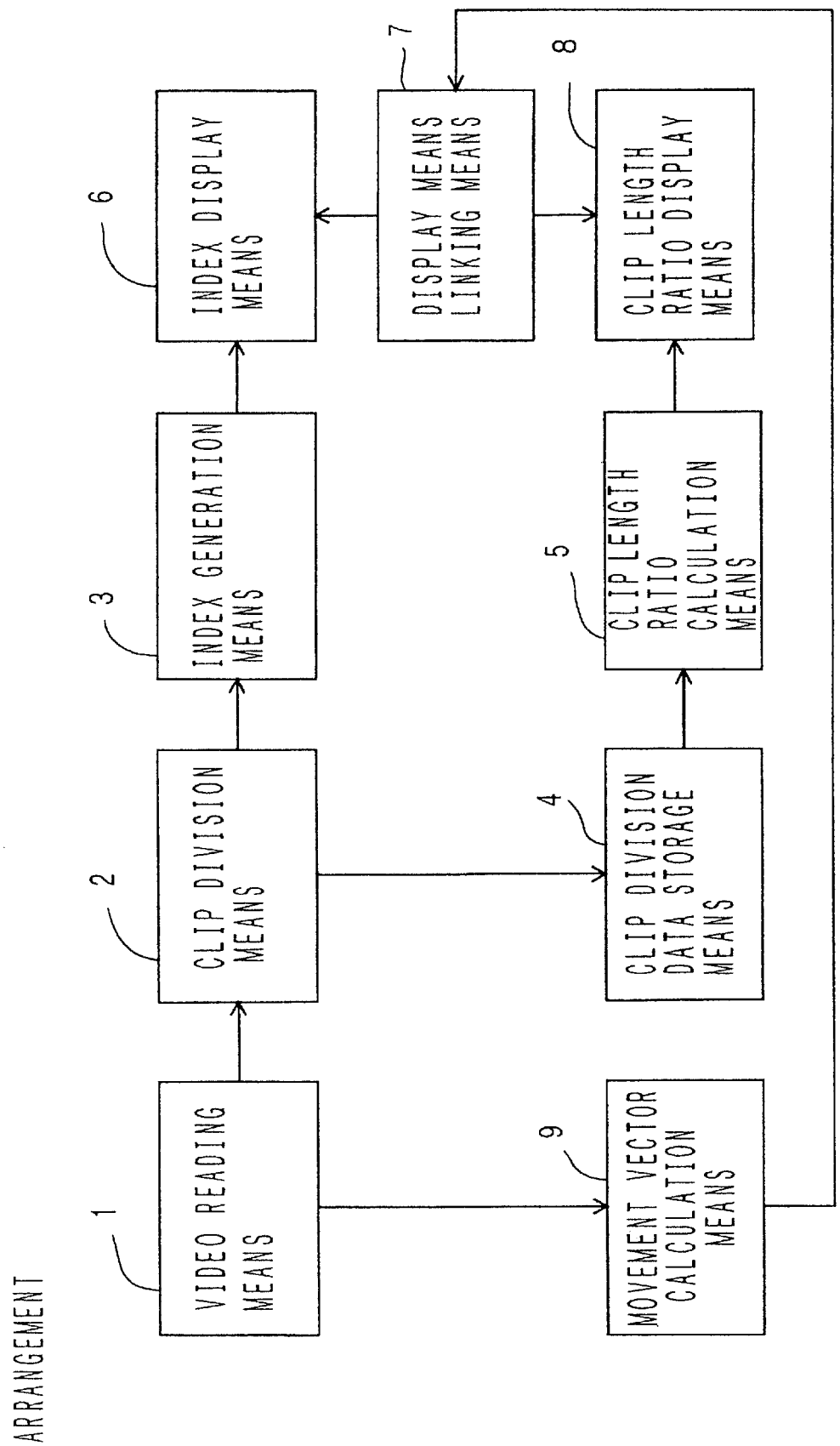
F I G. 5
ARRANGEMENT

ARRANGEMENT

FIG. 9 ARRANGEMENT

FIG.11 ARRANGEMENT

ARRANGEMENT

ARRANGEMENT

ARRANGEMENT

FIG. 18
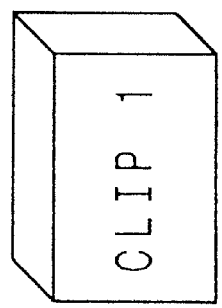
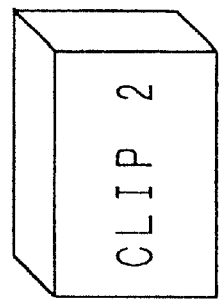
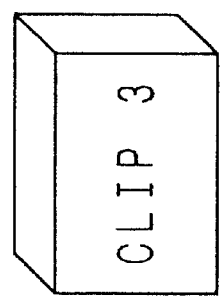
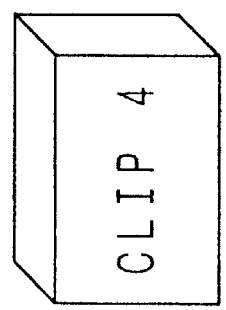
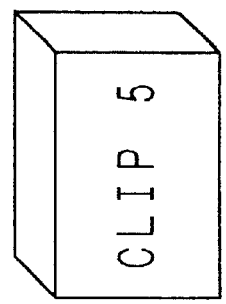
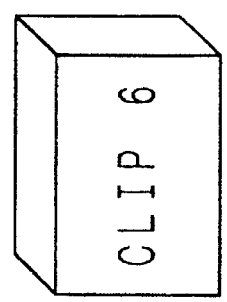
DEPTH:LENGTH OF CLIP

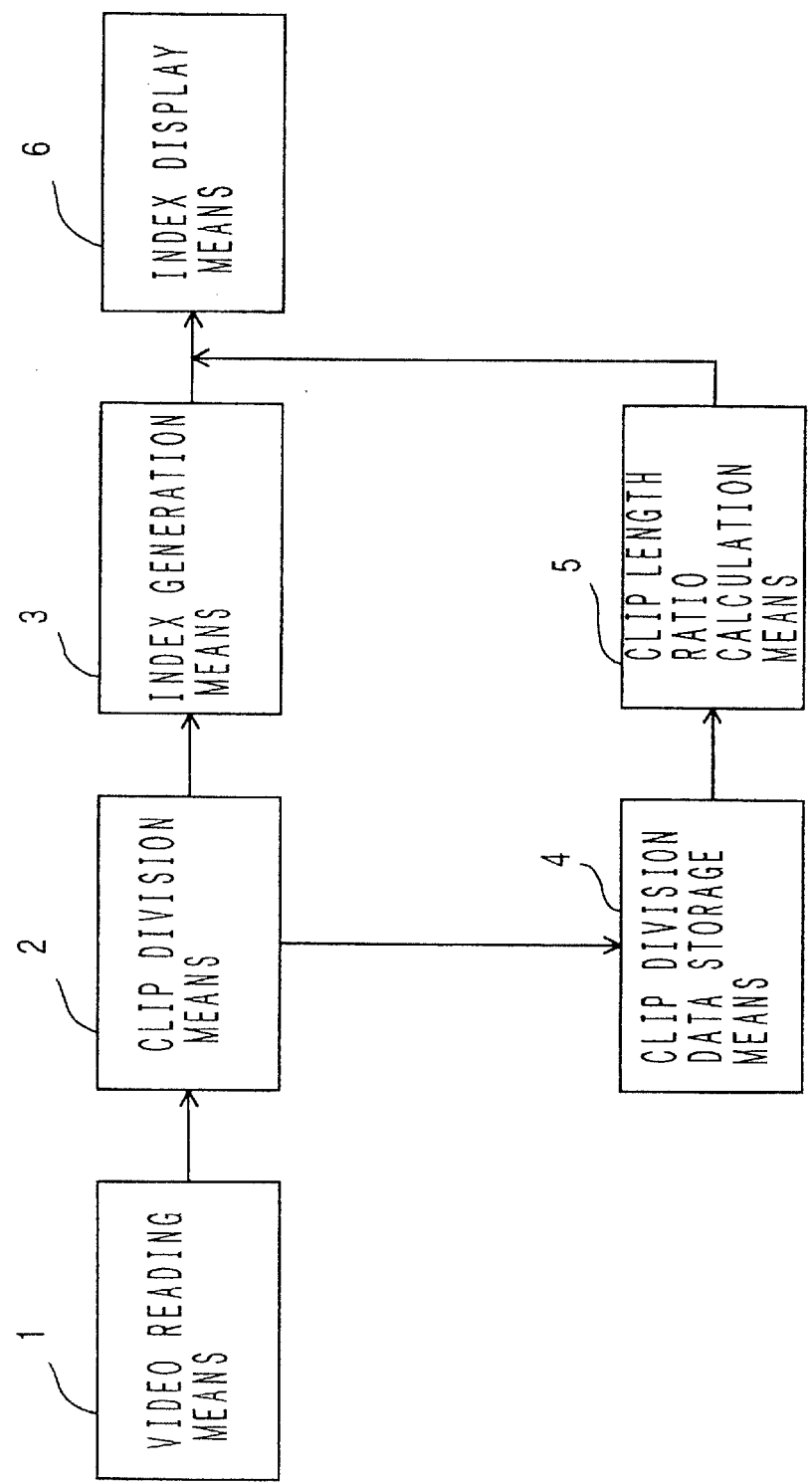
FIG. 20 CONVENTIONAL ARRANGEMENT

CLIP DISPLAY METHOD AND DISPLAY DEVICE THEREFOR

BACKGROUND OF THE INVENTION

1. Field of the Invention

The present invention relates to a method whereby when editing a motion picture, loaded from a disk or a video camera, individual pieces of information of scenes can be displayed on an editing device, and to a display device for this purpose; and in particular, to a method for displaying material to be edited that facilitates the editing operation.

2. Description of the Prior Art

Recently, the use of video devices, such as video cameras, that handle digital images has spread to the home. The editing of the images obtained with a digital camera is an easy task, and highly individualized stories can be prepared by employing devices that edit such motion pictures and change scene order while linking together only selected scenes.

A group of images for a scene, one of a number of image groups obtained by dividing a series of images at predetermined time intervals, is called a clip. A typical image (index) for each clip can be displayed on an editing device, and an editor can then edit scenes while viewing these images. However, since the length of a clip for a scene can not be ascertained only from the index, editing is sometimes difficult.

To resolve this problem, disclosed in Japanese Unexamined Patent Publication No. Hei 7-79404 is a method, as is shown in FIG. 18, whereby the indexes of clips, which are expressed as three-dimensional rectangular parallelepipeds, are displayed on the front faces of the parallelepipeds, and the lengths of the clips are represented by the depths of the rectangular parallelepipeds.

Disclosed in Japanese Unexamined Patent Publication No. Hei 7-79404 is a method, as is shown in FIG. 19, for reducing the indexes for clips in consonance with their lengths, and for displaying the resultant clips.

A conventional display device to provide such a display comprises, as is shown in FIG. 20, video reading means 1, for reading digital images supplied by a video camera or a disk; clip division means 2, for dividing a series of digital images into clips; clip division data storage means 4, for maintaining IN point and OUT point data for the obtained clips; index generation means 3, for generating indexes for the clips; clip length ratio calculation means 5, for calculating the ratios for the lengths of the individual clips; and index display means 6, for displaying indexes by employing data received from the index generation means 3 and the clip length ratio calculation means 5.

In this display device, when the video reading means 1 reads digital images from a video camera or a disk, the clip division means 2 divides the digital images into clips. The index generation means 3 generates typical images, which are used as indexes, using the first frames of the individual obtained clips and outputs the stationary images to the index display means 6.

The IN point and OUT point data for the clips are stored in the clip division data storage means 4. The clip length ratio calculation means 5 calculates the ratios for the lengths of the clips from the IN point and OUT point data, and outputs the ratio to the index display means 6. Upon receipt of the data from the index generation means 3 and the clip length ratio calculation means 5, the index display means 6 displays the indexes for the clips and the ratios for the lengths of the clips using the form shown in FIG. 18 or 19.

Using the display method in FIG. 18, however, it is difficult to visualize how clips are distributed and where they are located in a motion picture by using the ratios of the lengths of the clips to the total length of the movie. And according to the display method in FIG. 19, since in this case the size of an index is reduced, viewing a typical image is difficult.

In order to make the editing of motion pictures easy, it is important that there be displayed on an editing screen not only the index and the length of a clip, but also the contents of the images included in the clip, so that an individual performing the editing can easily understand this data and can select appropriate scenes for inclusion in the clip. According to the conventional display method, however, no consideration of such matters is taken.

SUMMARY OF THE INVENTION

To resolve the above described conventional problems, it is one objective of the present invention to provide a clip display method whereby the contents of a clip are clearly displayed and an be used to facilitate the editing of a motion picture, and to provide a display device therefor.

According to a method of the present invention, whereby clips obtained by dividing a motion picture are displayed by employing typical images of individual clips, a graphic representation for a motion picture is divided to provide segments corresponding to the ratio of the lengths of the clips to the total length of the motion picture, and presented are sequences of the separate graphic segments linked to typical images.

A motion vector and a color change for a clip or a moving object in a motion picture is displayed in each corresponding segment of the graphic representation covering the overall length of the motion picture.

Therefore, the locations and the lengths of the individual clips, as they are related to the motion picture, or the contents of the images included in the clips, can be ascertained at a glance, and the editing can be performed very smoothly.

According to the present invention, a clip display device comprises: index display means, for displaying typical images of individual clips; clip length ratio display means, for dividing a graphic representation of the overall length of a motion picture into segments at the ratios of the lengths of the clips to the overall length of the motion picture; and linking means, for linking the typical images displayed by the index display means with the segments of the graphic representation displayed by the clip length ratio display means.

The display device further comprises means for calculating, at a constant time interval, a motion vector from a motion picture; color data calculation means, for calculating at a constant time interval color data from a motion picture; and maximum movement object extraction means for extracting, at a constant time interval, an object that travels a maximum distance. The linking means links the thus obtained motion vector, the color data and the object that moves the maximum distance to the segments of the graphic representation that correspond to the overall length of the motion picture. The clip length ratio display means displays the items in the graphic segments that are linked together.

This display device can employ the above described clip display method.

According to one aspect of the invention, a clip display method, whereby clips obtained by dividing a motion picture are displayed using typical images of the clips, comprises the steps of:

dividing a graphic representation of the overall length of the motion picture into segments at ratios of lengths of the clips to the overall length of the motion picture; and linking the segments of the graphic representation with the typical images to display the clips. The locations of the clips in the motion picture and the ratio of the length of each clip to the overall length of the motion picture can be visually ascertained.

According to another aspect of the invention, the segments of the graphic representation are linked with the typical images by using colors or numerals. Since a segment having a color or a numeral provided for the typical image is searched for in the graphic representation of the overall length of the motion picture, the positioning in the motion picture of the clips represented by the typical images can be understood at a glance.

According to another aspect of the invention, a clip display method, whereby clips obtained by dividing a motion picture are displayed using typical images of the clips, comprises the steps of dividing a graphic representation of the overall length of the motion picture into segments equal in number to the clips so as to display the clips with the typical images; and displaying a motion vector, which represents the movement of an image in each of the clips, in a corresponding segment of the graphic representation. The movement of the typical image of the clip can be identified by monitoring the motion vector.

According to another aspect of the invention; a clip display method, whereby clips obtained by dividing a motion picture are displayed using typical images of the clips, comprises the steps of:

dividing a graphic representation of the overall length of the motion picture into segments equal in number to the clips to display the clips with the typical images; and displaying, in each of the segments, a change in an image color for a corresponding clip. The change in the color of the typical image for each clip can be understood..

According to still another aspect of the invention, a clip display method, whereby clips obtained by dividing a motion picture are displayed using typical images of the clips, comprises the steps of:

dividing a graphic representation of the overall length of the motion picture into segments equal in number to the clips to display the clips with the typical images; and displaying, between the segments of the graphic, border lines that are shaped in consonance with a numerical differential value between the images for the clips corresponding to the segments. Whether the differential value between the scenes of the preceding and the succeeding clip at a border line is great or small can be determined from the shape of the border line.

According to yet another aspect of the invention, the width or the type of line used for the border lines is changed in consonance with the numerical differential value. It can be ascertained that there is a large change of scene when a border line is thick, and that there is a small change of scene when a border line is thin. In addition, it can be ascertained that there is a large change of scene when a border line is represented by a solid line, and that there is a small change of scene when a border line is represented by a broken line.

According to another aspect of the invention; a clip display method, whereby clips obtained by dividing a motion picture are displayed using typical images of the clips, comprises the steps of:

dividing a graphic representing the overall length of the motion picture into segments equal in number to the clips to display the clips with the typical images; and extracting an object that travels the greatest distance from an image for each of the clips and displaying the object in a corresponding segment of the graphic representation. Therefore, what is moving in a typical image can be understood at a glance.

According to still another aspect of the invention, a clip display method, whereby clips obtained by dividing a motion picture are displayed using typical images of the clips, comprises the steps of:

dividing a graphic representation of the overall length of the motion picture into segments equal in number to the clips to display the clips with the typical images; and displaying, in the segments of the graphic representation, types of sounds that are recorded together with images for corresponding clips. Since the sounds recorded with the images of the clips are represented as either voices or music, the contents of a motion picture for a clip can be easily understood.

According to yet another aspect of the invention, when one typical image is selected, a mark is displayed in a corresponding segment of the graphic representation of the overall length of a motion picture, so that, when one location in the graphic representation of the overall length of the motion picture is selected, a corresponding typical image is displayed. The correspondence between a segment of the graphic representation of the overall length of the motion picture and a clip that is represented by a typical image can be ascertained at a glance.

According to another aspect of the invention, a clip display device, which displays clips obtained by dividing a motion picture using typical images of the clips, comprises: index display means for displaying the typical images of clips; clip length ratio display means for dividing a graphic representation of the overall length of a motion picture into segments at ratios of the lengths of the clips to the overall length of the motion picture; and linking means for linking the typical images displayed by the index display means to the segments of the graphic representation displayed by the clip length ratio display means. Segments of the graphic representation of the overall length of the motion picture are displayed that correspond to the ratios of the lengths of individual clips that are represented by the typical images to the overall length of the motion picture.

According to still another aspect of the invention, the linking means assigns the same color or numeral to the typical image and the segment that are linked together. The segments of the graphic representation of the overall length of the motion picture are displayed in colors assigned for corresponding typical images, or numerals assigned to the typical images are displayed in corresponding segments.

According to yet another aspect of the invention, further provided is motion vector calculation means for extracting two sequential frames from a motion picture at a constant time interval in order to calculate a motion vector.

The linking means links the obtained motion vector with the segments of the graphic representation, and the clip length ratio display means displays the motion vector in the segments of the graphic representation. As a result, the clips can be displayed using a method hereinabove described.

According to still another aspect of the invention, further provided is color data calculation means for extracting frames from a motion picture at a constant time interval in order to calculate data for the dominant color in each of the frames. The linking means links the obtained color data to the segments of the graphic representation, and the clip length ratio display means displays colors represented by the color data in the segments of the graphic representation. As a result, the clips can be displayed using a method hereinabove described.

According to still another aspect of the invention, further provided is differential value storage means for storing a differential value acquired between two sequential frames in order to divide a motion picture into clips. The linking means employs the differential value to designate the shapes of border lines between the segments of the graphic representation. The clip length ratio display means displays the border lines having the designated shapes between the segments of the graphic representation. As a result, the clips can be displayed using the method hereinabove described.

According to yet another aspect of the invention, further provided is maximum movement object extraction means for extracting two sequential frames from a motion picture at a constant time interval and calculating a motion vector therefrom to acquire an object that travels a maximum distance.

The linking means links the obtained objects with the segments of the graphic representation, and the clip length ratio display means displays the objects in the segments of the graphic representation. As a result, the clips can be displayed using.

According to another aspect of the invention, further provided is sound data acquisition means for extracting sound that is recorded with images at a constant time interval and for identifying a sound type. The linking means links the sound type that is identified with the segments of the graphic representation, and the clip length ratio display means displays graphic symbols representing the sound types in the segments of the graphic representation. As a result, the clips can be displayed using a method hereinabove described.

According to still another aspect of the invention, further provided are at least two of a motion vector calculation means for extracting at a constant time interval two sequential frames from a motion picture to calculate a motion vector, a color data calculation means for extracting at a constant time interval frames from a motion picture to calculate color data that are mainly included in the frames, a differential value storage means for storing a differential value between two sequential frames that is acquired to divide a motion picture into clips, a maximum movement object extraction means for extracting at a constant time interval two sequential frames from a motion picture and calculating a motion vector therefrom to acquire an object that travels the maximum distance, and a sound data acquisition means for extracting at a constant time interval sound that is recorded with a motion picture and for identifying sound types; and a selection means for selecting one or more of those means. When the motion vector calculation means is selected, the linking means links the obtained motion vector with the segments of the graphic representation, and the clip length ratio display means displays the motion vector in the segments of the graphic representation. When the color data calculation means is selected, the linking means links the obtained color data with the segments of the graphic representation, and the clip length ratio display means displays colors indicated by the color data in the segments of the graphic representation. When the differential value storage means is selected, the linking means employs the differential value to designate shapes of border lines between the segments of the graphic representation, and the clip length ratio display means displays the border lines having the designated shapes between the segments of the graphic representation. When the maximum movement object extraction means is selected, the linking means links the obtained objects with the segments of the graphic representation, and the clip length ratio display means displays the objects in the segments of the graphic representation. And when the sound data acquisition means is selected, the linking means links the sound type that is identified with the segments of the graphic representation, and the clip length ratio display means displays graphic symbols representing the sound types in the segments of the graphic representation. As a result, the clips can be displayed using two or more arbitrarily selected clipping methods hereinabove described.

According to yet another aspect of the invention, further provided are selection means for selecting a position in a typical image on or in the graphic representation of the overall length of a motion picture; and marking means for displaying a mark in a corresponding typical image when a segment of said graphic representation is selected, and for displaying a mark in a corresponding segment of the graphic representation in order to identify a typical image when a corresponding image is selected.

BRIEF DESCRIPTION OF THE DRAWINGS

These and other objects and features of the present invention will become more readily apparent from the following detailed description taken in conjunction with the accompanying drawings in which:

FIG. 1 is an explanatory diagram showing a clip display method according to a first embodiment of the present invention;

FIG. 4 is an explanatory diagram showing a clip display method according to a second embodiment of the present invention;

FIG. 5 is a block diagram illustrating the arrangement of a clip display device according to the second embodiment of the present invention;

FIG. 18 is an explanatory diagram showing a conventional clip display method;

FIG. 20 is a block diagram illustrating the arrangement of a conventional clip display device.

DETAILED DESCRIPTION OF THE PREFERRED EMBODIMENTS

The embodiments of the present invention will now be described referring to the accompanying drawings.

(First Embodiment)

An explanation will be given for a clip display for a first embodiment where the locations of clips in a motion picture and the ratio of the length of each clip to the length of a motion picture are displayed to be discernible.

Figure 2:
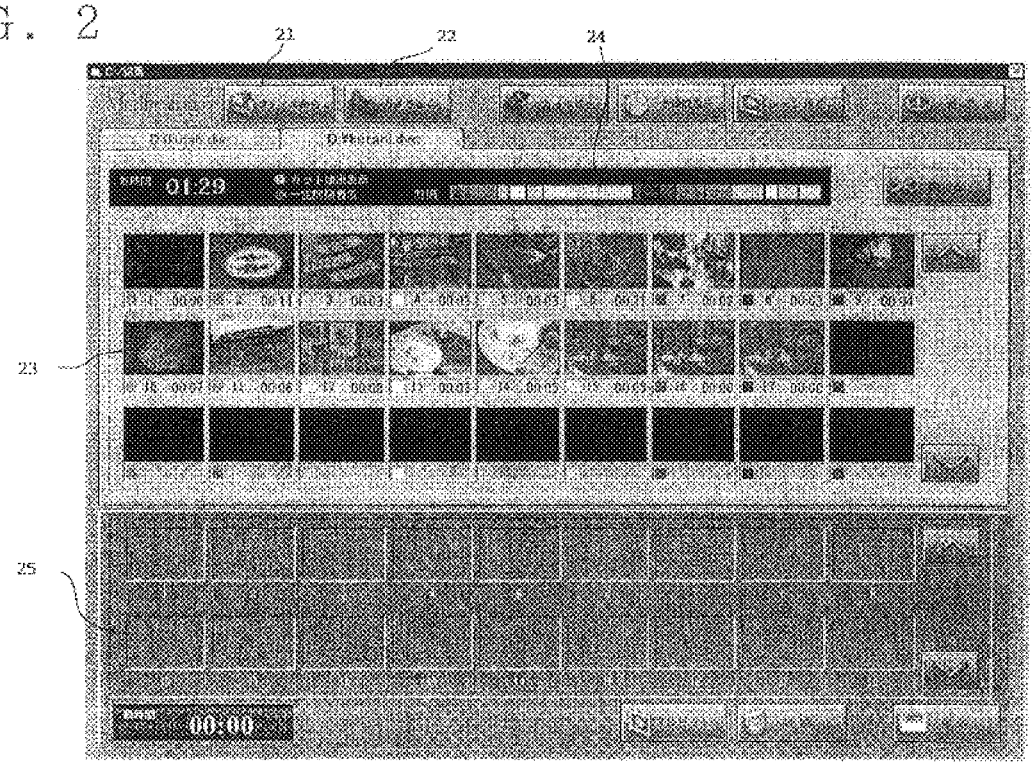
FIG. 2 is a diagram illustrating an editing screen of an editing device.

First, an operating screen of a motion picture editing device that was developed by a group including the present inventor will be described. As is shown in FIG. 2, on this screen are displayed an operating button 21, for fetching digital images from a file; an operating button 22, for fetching images from a digital video camera; a pre-edited index display 23, for displaying indexes for pre-edited clips; a bar 24, for displaying relationships between individual clips and a motion picture; and a post-edited index display 25, for displaying an index for a clip, the scene of which has been selected by an editor.

When the editor manipulates the button 21 on the operating screen, digital images are read from a file; and when the editor manipulates the button 22, digital video image are read from a video camera. The images are divided into clips for individual scenes, and the indexes for the clips are displayed on the pre-edited index display 23. The relationship between each clip and the motion picture is displayed in the bar 24.

When the editor selects clips to be edited from the indexes that are displayed on the pre-edited index display 23, while referring to the display on the bar 24, the indexes for the selected clips are displayed on the post-edited index display 25, and the clips are linked in the order at which they were selected. The editing device is described in detail in another patent application.

According to the clip display method of this invention, the display on the pre-edited index display 23 is linked with the display on the bar 24 so that the editor can easily ascertain the contents of the clips. According to the clip display method of the first embodiment, as is shown in FIG. 1, various colors corresponding to the indexes for the clips on the pre-edited index display 23 are used to establish the lengths of the individual clips that are displayed on the bar 24. Therefore, the ratio of the length of each clip to the motion picture and the location of each clip in the motion picture can be ascertained at a glance.

Figure 3:
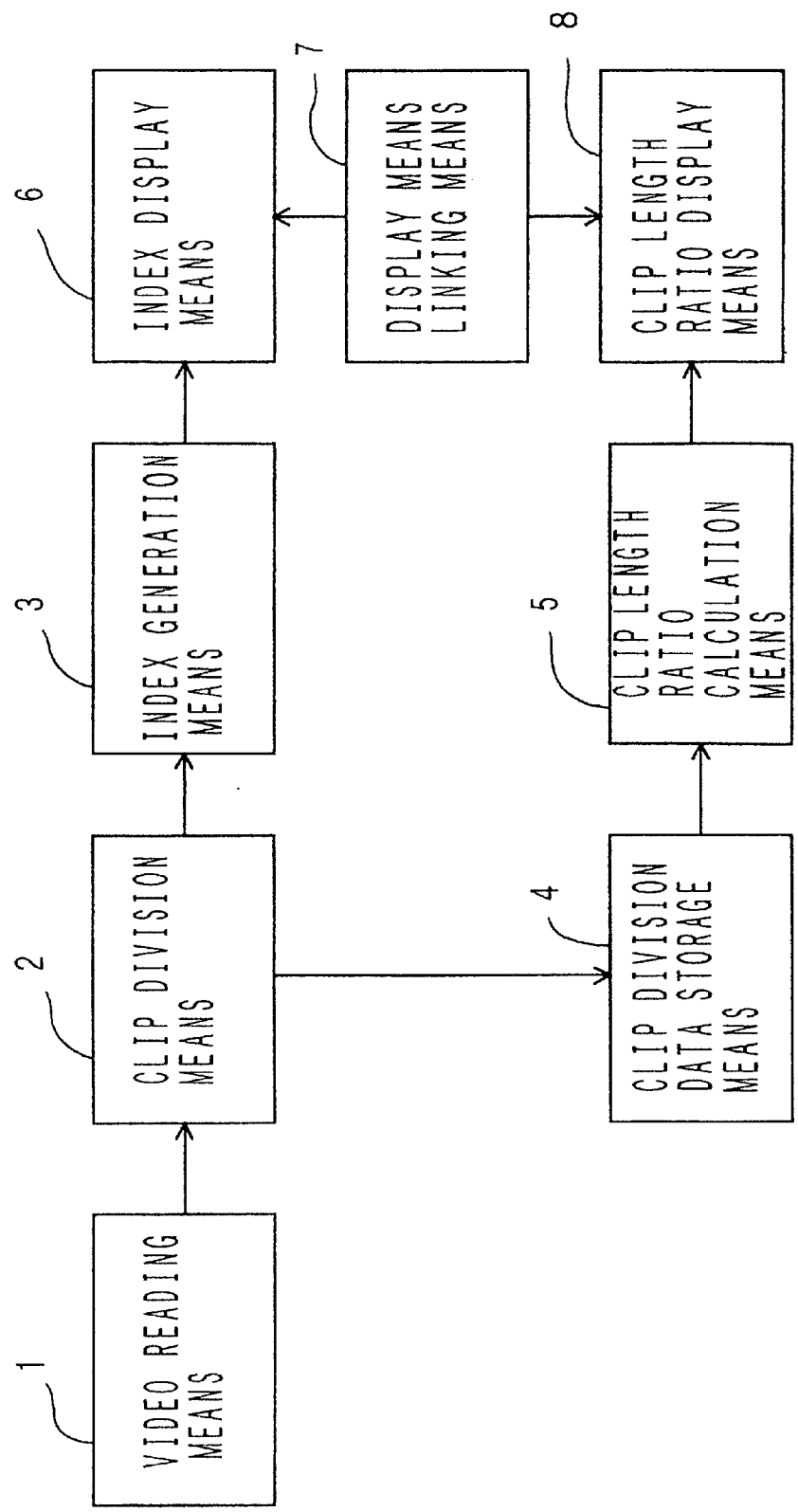
FIG. 3 is a block diagram illustrating the arrangement of a clip display device according to the first embodiment of the present invention.

The display device for providing such a display comprises, as is shown in FIG. 3, video reading means 1, for reading digital images from a video camera or from a hard disk; clip division means 2, for dividing a digital image into clips; clip division storage means 4, for holding IN point and OUT point data for the clips; index generation means 3, for generating indexes for the clips; index display means 6, for displaying the indexes generated by the index generation means 3; clip length ratio calculation means 5, for calculating a ratio for the length of each clip; clip length ratio display means 8, for displaying on the bar 24 separate segments whose sizes correspond to the length ratio for individual clips; and display means linking means 7, for linking the indexes displayed on the index display means 6 with the separate segments on the bar 24.

The video reading means 1 of the display device reads from a storage device, such as a hard disk, a video signal that is encoded using the DV method and transmits the encoded signal to the clip division means 2.

The DV method is based on the specifications for digital video devices, such as digital video cameras, and conforms to the video cassette recorder specifications that were established in 1996, "Specifications for Consumer-Use Digital VCRs (HD Digital VCR Conference, 1996)." DCT (dispersion cosine conversion) is performed for each block of DV data, and image compression is provided by reducing the spatial redundancy in a frame for this process. One macro block for DV data consists of four horizontally arranged luminance signal blocks and two chrominance signal (CR and CB) blocks that are located at corresponding positions, and has a color component form of 4:1:1. A super block is constituted by 27 of the macro blocks, and a 5×10 array of the super blocks constitutes one frame.

When the clip division means 2 receives a video signal, it generates clips using a method selected by an operator, i.e., a method for dividing an image at specific time intervals (e.g., intervals of one second) or an image division method for automatically detecting a change of scene. When the second method is selected, a differential value between the video data for two sequentially positioned frames is calculated (for DV data, the compression rate for each macro block is employed as the video data for the calculation, and the sum of the differential values between frames is acquired). When the differential value is greater than a threshold value, it is determined that at that position there has been a change of scene.

The index generation means 3 generates an index using the first frame of a clip obtained by the clip division means 2. For DV, for example, a Bitmap that is so generated by extracting a direct current element is regarded as an index.

The index display means 6 displays in order the Bitmaps generated along the time axis by the index generation means 3.

The clip division data storage means 4 stores IN point and OUT point data for the clips provided by the clip division means 2, and the clip length ratio calculation means 5 employs the IN point and OUT point data for clip division to calculate the ratio of the length of each clip to the overall length of the motion picture. The clip length ratio display means 8 employs the length ratios obtained by the clip length ratio calculation means 5 to divide the area of the bar 24, so that the ratio of the length of each clip to the total length of a motion picture is readily apparent.

The display means linking means 7 links the indexes displayed by the index display means 6 with the segments on the bar 24 displayed by the clip length ratio display means 8. For example, an "x" is displayed in the segment on the bar 24 that corresponds to the index for clip x, or n colors are assigned in order to the clips and a color corresponding to a clip is assigned to a corresponding segment on the bar 24.

Therefore, when an editor looks at the indexes and the bar that are displayed, he or she can understand at a glance the ratio of the length of each clip to the overall length of the motion picture and the location of each clip in the motion picture, and can easily edit the images.

(Second Embodiment)

For a second embodiment, an explanation will be given for a clip display where the movement of an image in each clip is displayed so as to be discernible.

According to this display method, as is shown in FIG. 4, the area of a bar 24 is divided into segments using the ratios of the lengths of individual clips to the overall length of a motion picture, and the movement of an image for a clip is displayed by using arrows in a corresponding segment. When, for example, a person is displayed in the index of a clip, the direction in which the person is to be moved in the image can be understand at a glance by looking at the arrows in a corresponding segment of the bar 24.

A display device for providing such a display comprises, as is shown in FIG. 5, motion vector calculation means 9, for determining the movement of an object from an image that is read. The other arrangements are the same as those for the device of the first embodiment in FIG. 3.

The motion vector calculation means 9 extracts two sequential frames from the video reading means 1 at a constant time interval (e.g., an interval of two seconds), and calculates a motion vector for predetermined segments (e.g., centers) of frames. The calculation performed for the motion vector is the same as that performed for Mpeg1 and 2. When the motion vector calculation means 9 obtains the motion vector, it converts the vector into one that most nearly approximates one of a number of vectors for n directions (e.g., four directions). When no motion vector is obtained, it is assumed that no vector exists.

The display means linking means 7 employs the vector obtained by the motion vector calculation means 9 to perform the mapping of the bar 24 that is displayed by the clip length ratio display means 8.

The arrows that represent motion vectors for the images of the individual clips are displayed on the bar 24. For a clip for which the ratio of its length to the overall length of a motion picture is large, a plurality of arrows are displayed that represent the motion vectors at constant time intervals.

Therefore, when an editor looks at the displays of the indexes and the bar 24, he or she can visualize the movement of the image in each clip, and can easily select scenes for editing.

(Third Embodiment)

For a third embodiment, an explanation will be given for a clip display where a change of colors in an image of each clip is displayed.

Figure 6:
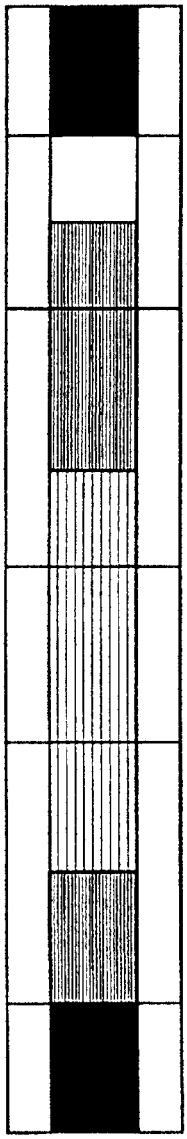
FIG. 6 is an explanatory diagram showing a clip display method according to a third embodiment of the present invention.
Figure 7:
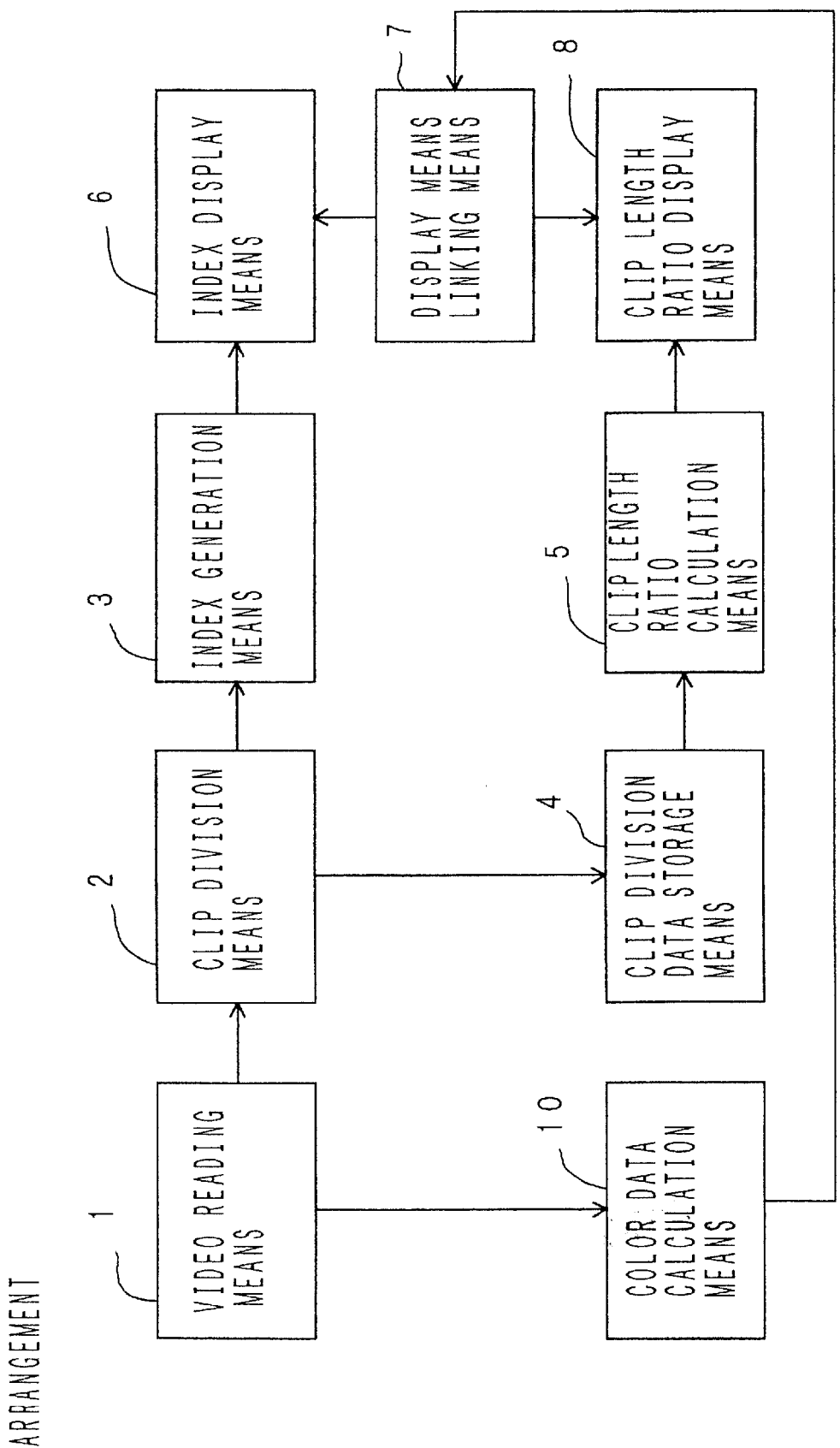
FIG. 7 is a block diagram illustrating the arrangement of a clip display device according to the third embodiment of the present invention.

According to this display method, as is shown in FIG. 6, the area of a bar 24 is divided into segments at ratios corresponding to the lengths of individual clips to the overall length of a motion picture, and a main color used in an image for a clip and the changing of the color are displayed in a corresponding segment. When, for example, the scene for a clip represents the sunset, following the time axis, the color displayed in a corresponding segment on the bar 24 is changed to a darker color. Thus, how the image color for the clip is changed can be understood.

A display device for providing such a display comprises, as is shown in FIG. 4, color data acquisition means 10 for acquiring color data from an image that is read. The other arrangements are the same as those for the device of the first embodiment shown in FIG. 3.

The color data acquisition means 10 acquires a single frame from the video reading means 1 at constant time intervals, and employs luminance and chrominance signals to acquire, for each block, color data that are included in the frame. Then, the color data for each block is changed to one that most nearly approximates one color of a set of n colors. The color of the set of n colors that is most used in the frame is determined and is employed as the model color for the frame. While in this embodiment only one color is used as the model color for a frame, a frame may be divided into a plurality (m) of regions, a model color for each of the regions may be determined, and the so obtained m colors may be employed as model colors for the frame.

The display means linking means 7 employs the model color obtained by the color data calculation means 10 to perform the mapping for the bar 24 that is displayed by the clip length ratio display means 8.

The model colors for images in the individual clips are displayed on the bar 24. For clips for which the ratios of their lengths to the overall length of the motion picture are large, the model colors are displayed in order at constant time intervals.

Therefore, when an editor looks at the displays of the indexes and the bar 24, he or she can grasp the meaning of the changing colors for the image in each clip, and can easily select scenes for editing.

(Fourth Embodiment)

For a fourth embodiment, an explanation will be given for a clip display where the degree of change between scenes is displayed.

Figure 8:
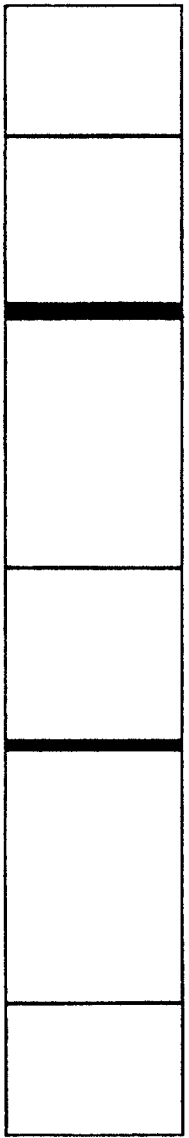
FIG. 8 is an explanatory diagram showing a clip display method according to a fourth embodiment of the present invention.

According to this display method, as is shown in FIG. 8, the area of a bar 24 is divided into segments at ratios of the lengths of individual dips to the overall length of a motion picture, and the thickness of a border line that is displayed corresponds to the degree of change between scenes. When, for example, a scene for a specific clip differs completely from a scene for a succeeding clip, a thick border line is displayed. But when a scene for a specific clip is similar to a scene for a succeeding clip, a thin border line is displayed. Thus, the degree of change between scenes can be derived from the relative thickness of a border line.

Figure 9:
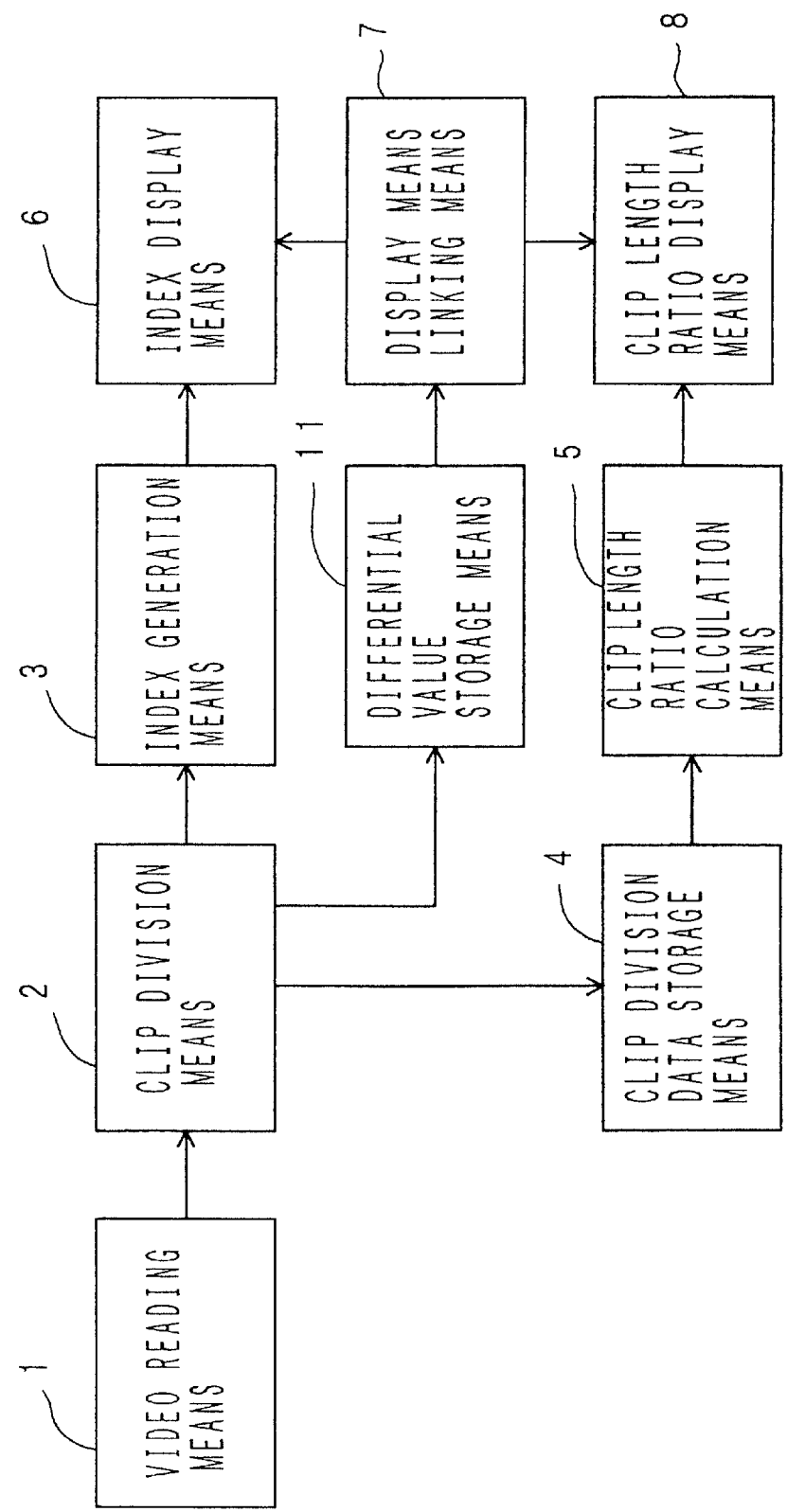
FIG. 9 is a block diagram illustrating the arrangement of a clip display device according to the fourth embodiment of the present invention.

A display device for providing such a display comprises, as is shown in FIG. 9, differential value storage means 11 for holding the differential value calculated by the clip division means 2 for the detection of scenes. The other arrangements are the same as those for the device of the first embodiment shown in FIG. 3.

In this device, when the clip division means 2 detects scene changes in images carried by a video signal and divides the images into segments, the differential values between the frames that are calculated for the clip division by the clip division means 2 are stored in the difference value storage means 11.

After the clip division means 2 divides the images at constant time intervals, for each division point it calculates a differential value between the preceding and the succeeding frame and stores it in the differential value storage means 11.

The display means linking means 7 employs the differential value data stored in the differential value storage means 11 to sort into n groups the image separation types for the clips, and transmits a message to that effect to the clip length ratio display means 8. Based on the received data, the clip length ratio display means 8 displays the bar 24, while changing the thicknesses of the border lines on the bar 24.

In this manner, border lines having widths that correspond to the degree of the changes between scenes are displayed in the bar 24. Instead of changing the thickness of the border lines, the clip length ratio display means 8 may change the types of border lines that are used (broken lines or wavy lines) or the colors of the border lines, Therefore, when an editor looks at the displays of the indexes and the bar 24, he or she can understand how the images change between clips, and can easily select scenes for editing.

(Fifth Embodiment)

For a fifth embodiment, an explanation will be given for a clip display in which, for each clip, the object in the image that moves the most is displayed.

Figure 10:
FIG. 10 is an explanatory diagram showing a clip display method according to a fifth embodiment of the present invention.

According to this display method, as is shown in FIG. 10, the area of the bar 24 is divided into segments at ratios of the lengths of individual clips to the overall length of a motion picture, and the object that moves the most is extracted for each clip and is displayed in a corresponding segment. When two planes are displayed in a segment on the bar 24, it means that the planes are moving in the index for a corresponding clip and that the moving planes also appear in an image after a specific time has elapsed. When a horse is displayed only on the right side of a segment on the bar 24, it means that no moving object is shown in the index, but that a moving horse appears in an image after a predetermined time has elapsed.

Figure 11:
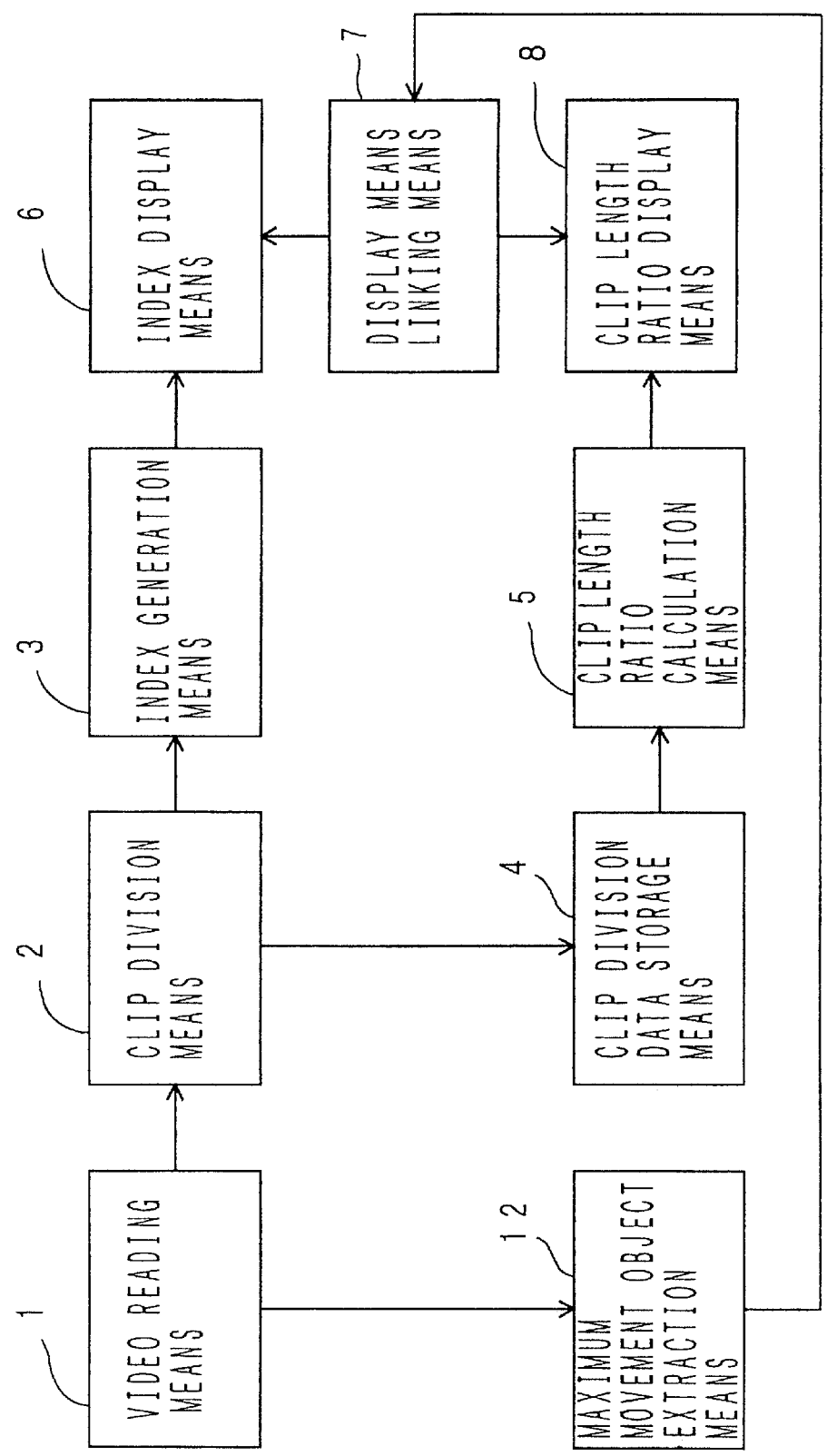
FIG. 11 is a block diagram illustrating the arrangement of a clip display device according to the fifth embodiment of the present invention.

A display device for providing such a display comprises, as is shown in FIG. 11, maximum movement object extraction means 12 for detecting, from images that is read, the object that has the maximum movement. The other arrangements are the same as those for the device of the first embodiment shown in FIG. 3.

The maximum movement object extraction means 12 extracts two sequential frames from the video reading means 1 at a constant time interval, calculates a motion vector for each macro block, and cuts out an image portion that reflects the maximum motion vector and that moves in the same way.

The display means linking means 7 performs mapping, on the bar displayed by the clip length ratio display means 8, for an image that is extracted by the maximum movement object extraction means 12.

As a result, for each clip, an object that moves the most in an image is displayed on the bar 24. For a clip for which the ratio of its length to the overall length of a motion picture is large, a plurality of objects that move the most are selected from among the images extracted at constant time intervals along the time axis and are displayed.

Therefore, when an editor looks at the displays of the indexes and the bar 24, he or she can identify for each clip an object that is moving in an image, and can easily select scenes for editing.

(Sixth Embodiment)

For a sixth embodiment, an explanation will be given for a clip display where symbols are displayed for the types of sounds recorded with images.

Figure 12:
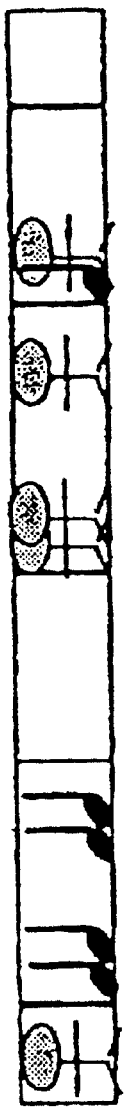
FIG. 12 is an explanatory diagram showing a clip display method according to a sixth embodiment of the present invention.

According to this display method, as is shown in FIG. 12, the area of the bar 24 is divided into segments at ratios of the lengths of individual clips to the overall length of a motion picture. When the sound recorded with images for a clip is a voice, the figure of a person is displayed in a segment, and when the sound recorded with images is music, a note is displayed. When both voice and music are recorded, the figure of a person and a note are overlapped on a display.

Figure 13:
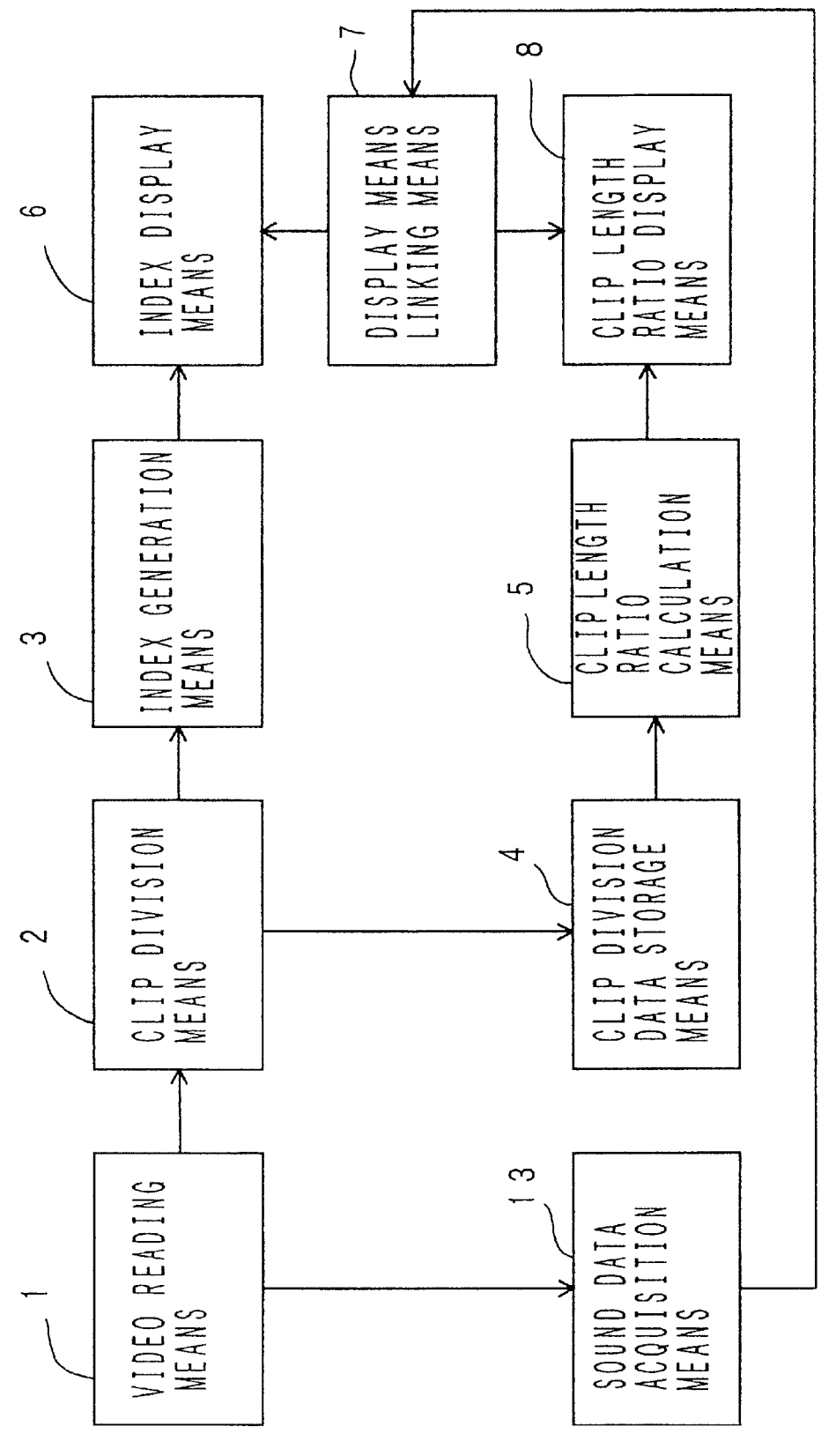
FIG. 13 is a block diagram illustrating the arrangement of a clip display device according to the sixth embodiment of the present invention.

A display device for providing such a display comprises, as is shown in FIG. 13, sound data acquisition means 13 for acquiring sounds recorded with images and identifying types of the sounds. The other arrangements are the same as those of the device for the first embodiment in FIG. 3.

The sound data acquisition means 13 extracts sound data, which have been recorded with images, from the video reading means 1 at constant time intervals, and examines the frequency bands for sounds and the management of changes in the frequencies, and the presence/absence of a soundless portion to identify whether the sound is a voice or is music (the voice of a person includes an invoiced portion, while music does not include such a portion).

The display means linking means 7 transmits the sound data obtained by the sound data acquisition means 13 to the clip length ratio display means 8, which, based on the sound data, displays the figure of a person, or a note, in each segment on the bar 24.

In this manner, the figures of persons or notes are displayed to represent the sound type, and for a clip for which the ratio of its length to the overall length of a motion picture is large, a plurality of sound types are displayed that are identified at constant time intervals along the time axis.

Therefore, when an editor looks at the displays of the indexes and the bar 24, he or she can ascertain what types of sounds are recorded with the images for clips, and can easily select scenes for editing.

(Seventh Embodiment)

A display method according to a seventh embodiment can be provided by the arbitrary combination of the display methods of the second to the sixth embodiments.

Figure 14:
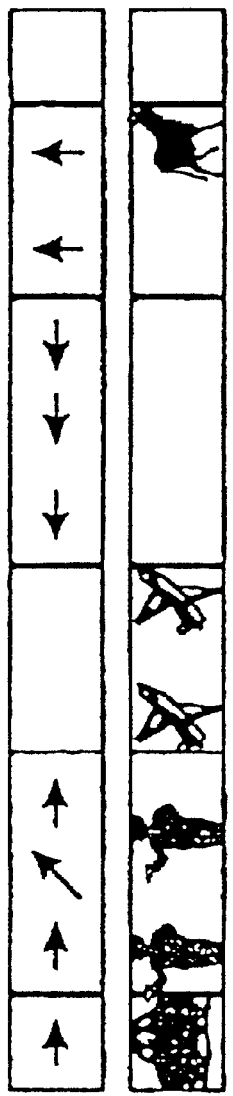
FIG. 14 is an explanatory diagram showing a clip display method according to a seventh embodiment of the present invention.

In FIG. 14 is shown a combination of the display methods of the second and the fifth embodiments. With this display, an object in the index that is moving and the direction of its movement can be ascertained.

Figure 15:
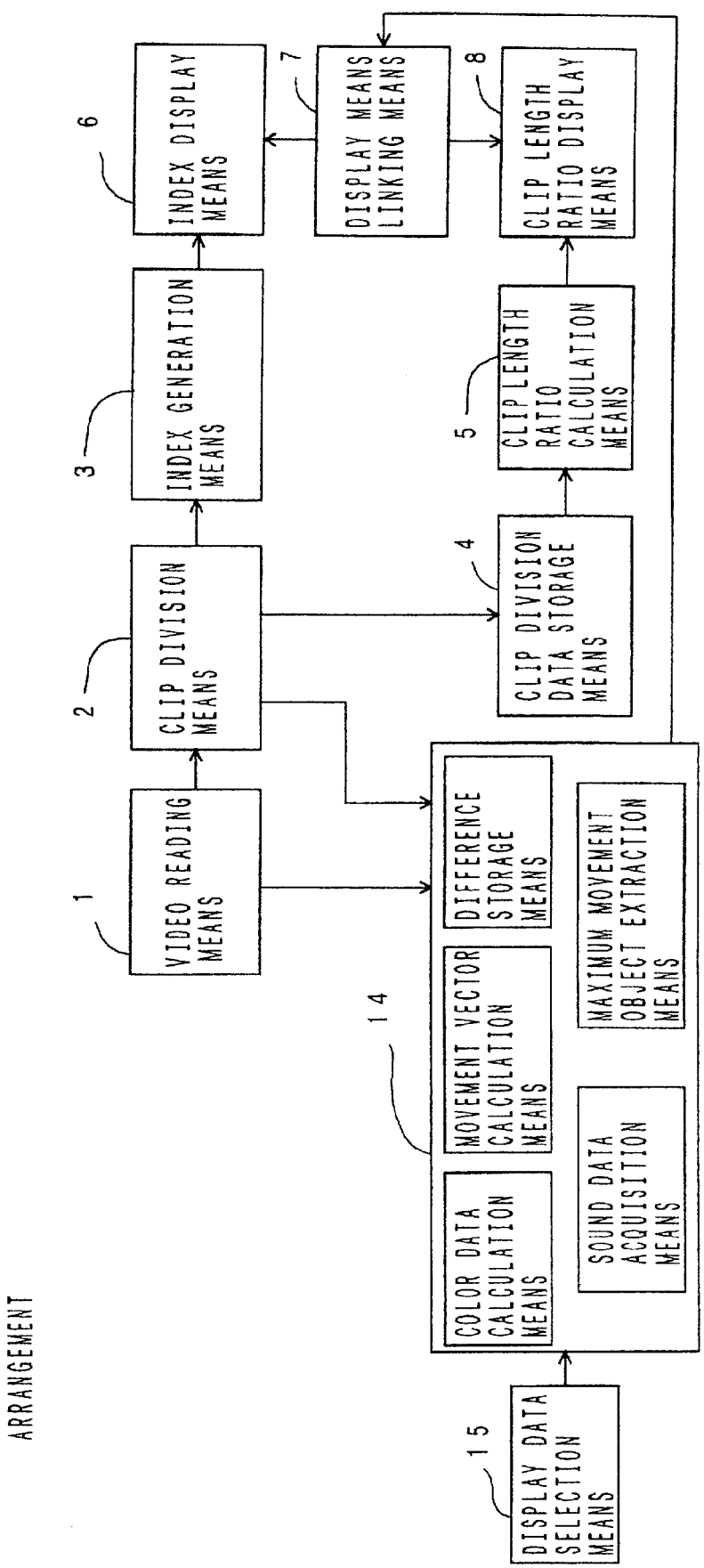
FIG. 15 is a block diagram illustrating the arrangement of a clip display device according to the seventh embodiment of the present invention.

A display device for providing such a display comprises, as is shown in FIG. 15, a means unit 14 that includes motion vector calculation means, color data calculation means, differential value storage means, maximum movement object extraction means and sound data acquisition means; and display data selection means 15 for selecting several means from the means unit 14. The other arrangements are the same as those for the device according to the first embodiment in FIG. 3.

With this device, when an editor manipulates the display data selection means 15 to select one or more means from the means unit 14, the selected means is activated to perform a display method selected from those of the second to the sixth embodiments.

When a combination of the clip display methods is employed, an editor can obtain a better understanding of the contents of a clip, and as the editor can efficiently locate a desired scene, the editing is easy.

(Eighth Embodiment)

In an eighth embodiment, an explanation will be given for a clip display where the correspondence between segments displayed on a bar and clips is so depicted that it can be easily understood.

Figure 16:
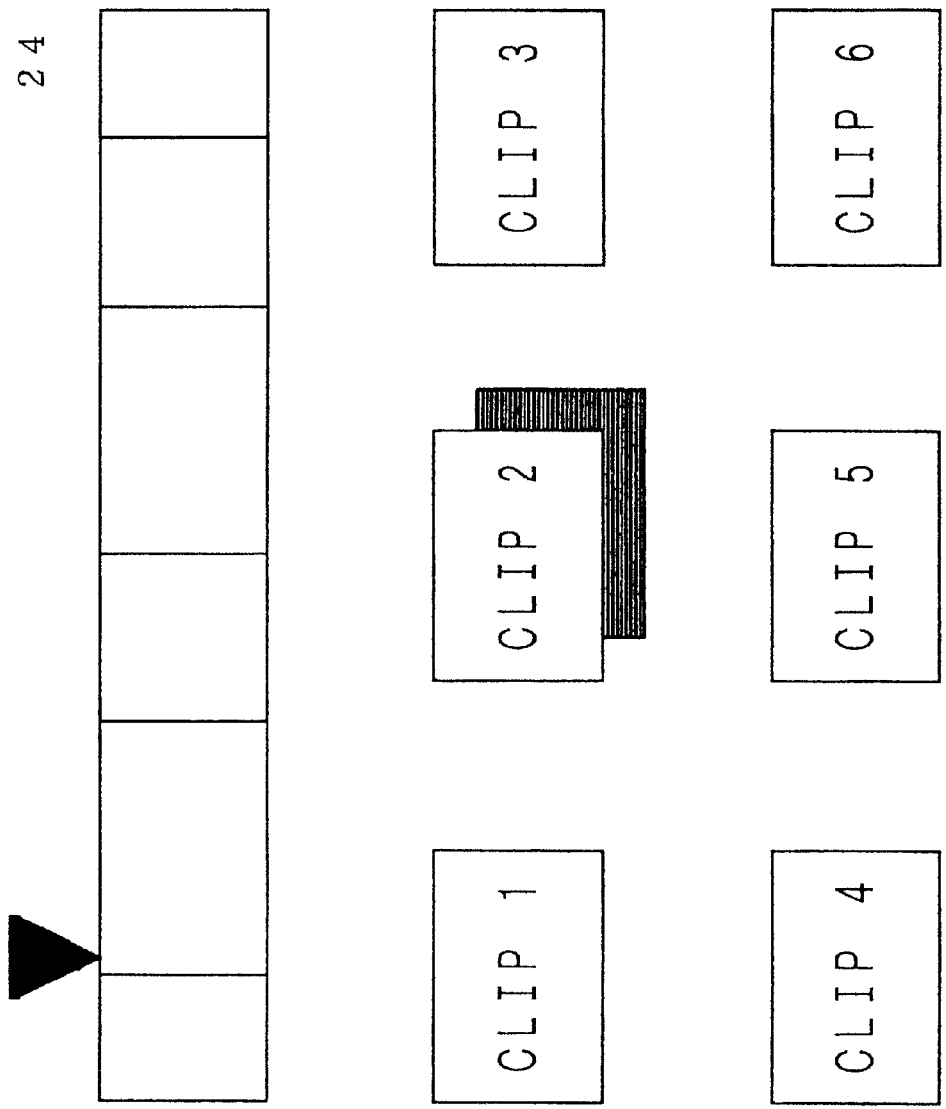
FIG. 16 is an explanatory diagram showing a clip display method according to an eighth embodiment of the present invention

According to this display method, as is shown in FIG. 16, the area of a bar 24 is divided into segments at ratios of the lengths of individual clips to the overall length of a motion picture. When an editor selects the index for a specific clip, a triangular mark is displayed in a corresponding segment on the bar 24. And when an editor selects one segment on the bar 24, a mark is displayed in the index of a corresponding clip. Therefore, the editor can immediately understand the correspondence between the clips and the segments on the bar 24, and can quickly find a specific clip by designating an approximate location of the motion picture on the bar 24.

Figure 17:
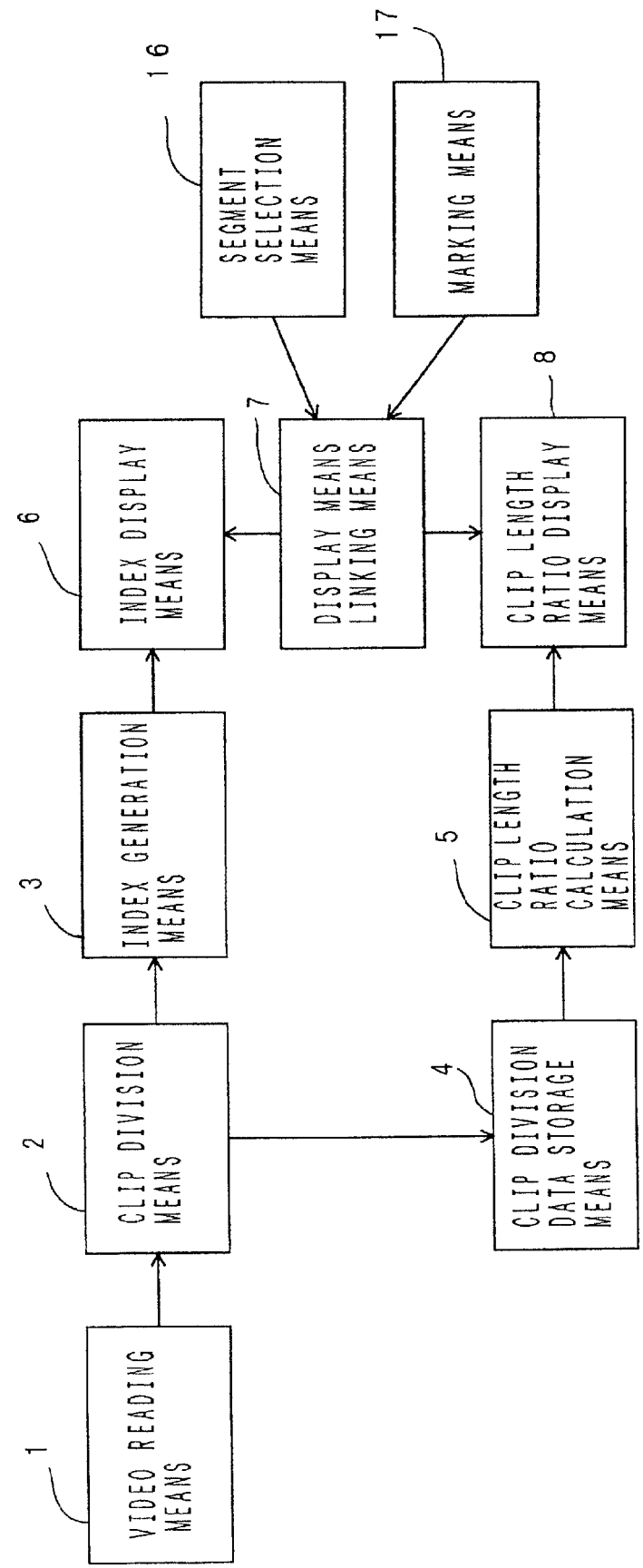
FIG. 17 is a block diagram illustrating the arrangement of a clip display device according to the eighth embodiment of the present invention.
Figure 19:
FIG. 19 is an explanatory diagram showing another example of a conventional clip display method.

A display device for providing such a display comprises, as is shown in FIG. 17, segment selection means 16 for permitting an editor to select a segment, and marking means 17 for providing a mark at a selected segment and at its linking destination. The other arrangements are the same as those of the device according to the first embodiment in FIG. 3.

In this device, when an editor selects one index using the segment selection means 16, the selected location is transmitted to the display means linking means 7.

The marking means 17 designates a mark figure that is to be provided for a selected index, and a mark figure that is to be provided for a linking position in the bar 24. The display means linking means 7 transmits to the index display means 6 data that indicate the selected index and the mark figure that is to be provided for the index, and also transmits to the clip length ratio display means 8 the position of the bar 24 for linking with the selected index and the mark figure that is to be provided for that position.

Upon receipt of the data, the clip length ratio display means 8 displays a triangular mark at the selected position on the bar 24, and the index display means 6 displays a shadow mark at the selected index.

When the editor selects the position on the bar 24 using the segment selection means 16, the same process is performed, and a shadow mark is displayed at the index to be linked with, while a triangular mark is displayed at the selected position on the bar 24.

Therefore, the editor can easily understand the correspondence of the clips and the segments on the bar 24 simply by manipulating the segment selection means 16, and editing can be easily performed.

As is apparent from the above description, according to the display method of the present invention, the position of each clip relative to a motion picture, and the ratio of the length of each clip to the overall length of the motion picture can be visually identified.

According to the display method for displaying a motion vector, the movement of a typical image for a clip is ascertained; according to the display method for displaying a change in colors, the change in the image color for a clip is ascertained; and according to the display method for changing the shape of border lines in consonance with the differential value between the images, the magnitude of the change between scenes is ascertained from the thickness and the type of border line. And according to the display method for displaying an object that performs the maximum move, what is moving in a typical image is ascertained, and according to the display method for displaying a sound type, the types of sounds recorded with images is ascertained.

Therefore, from these displays, an editor can exactly recall the contents of the individual clips of a motion picture the editor took, or of a motion picture that the editor previewed, and can precisely and efficiently perform editing.

Further, according to the display method whereby when a typical image is selected, a mark is displayed on a figure that represents the overall length of a motion picture and whereby when a specific position is selected in a figure, a corresponding typical image is displayed so that an editor can identify it, the correspondence between the area of the graphic representation that represents the overall length of a moving image and the clip that is represented by a typical image can be understood at a glance. Further, when an approximate position in the motion picture is selected by referring to the figure, a pertinent clip can be found.

The clip display device of the present invention can perform these clip display methods.

Furthermore, in the display device that can perform a combination of these clip display methods, when a plurality of display methods are performed, the contents of a clip can be understood better, and the efficiency of the editing can be further improved.

While the present invention has been described with reference to preferred embodiments, various variations and modifications may be made without departing from the scope of the invention.

What is claimed is:

1. A clip display method, whereby clips obtained by dividing a motion picture are displayed using typical images of said clips, comprising the steps of:

dividing a graphic representation of the overall length of said motion picture into segments at ratios of lengths of said clips to the overall length of said motion picture; and linking said segments of said graphic representation with said typical images to display said clips.

2. A clip display method according to claim 1, wherein said segments of said graphic representation are linked with said typical images by using colors or numerals.

3. A clip display method, whereby clips obtained by dividing a motion picture are displayed using typical images of said clips, comprising the steps of:

dividing a graphic representation of the overall length of said motion picture into segments equal in number to said clips so as to display said clips with said typical images; and displaying a motion vector, which represents the movement of an image in each of said clips, in a corresponding segment of said graphic representation.

4. A clip display method, whereby clips obtained by dividing a motion picture are displayed using typical images of said clips, comprising the steps of:

dividing a graphic representation of the overall length of said motion picture into segments equal in number to said clips to display said clips with said typical images; and displaying, in each of said segments, a change in an image color for a corresponding clip.

5. A clip display method, whereby clips obtained by dividing a motion picture are displayed using typical images of said clips, comprising the steps of:

dividing a graphic representation of the overall length of said motion picture into segments equal in number to said clips to display said clips with said typical images; and displaying, between said segments of said graphic, border lines that are shaped in consonance with a differential value between said images for said clips corresponding to said segments.

6. A clip display method according to claim 5, wherein the width or the type of line used for said border lines is changed in consonance with said differential value.

7. A clip display method, whereby clips obtained by dividing a motion picture are displayed using typical images of said clips, comprising the steps of:

dividing a graphic representing the overall length of said motion picture into segments equal in number to said clips to display said clips with said typical images; and extracting an object that travels the greatest distance from an image for each of said clips and displaying said object in a corresponding segment of said graphic representation.

8. A clip display method, whereby clips obtained by dividing a motion picture are displayed using typical images of said clips, comprising the steps of:

dividing a graphic representation of the overall length of said motion picture into segments equal in number to said clips to display said clips with said typical images; and displaying, in said segments of said graphic representation, types of sounds that are recorded together with images for corresponding clips.

9. A clip display method according to claim 1, wherein, when one typical image is selected, a mark is displayed in a corresponding segment of said graphic representation of the overall length of a motion picture, so that, when one location in said graphic representation of the overall length of said motion picture is selected, a corresponding typical image is displayed.

10. A clip display device, which displays clips obtained by dividing a motion picture using typical images of said clips, comprising:

index display means for displaying said typical images of clips;

clip length ratio display means for dividing a graphic representation of the overall length of a motion picture into segments at ratios of the lengths of said clips to said overall length of said motion picture; and linking means for linking said typical images displayed by said index display means to said segments of said graphic representation displayed by said clip length ratio display means.

11. A clip display device according to claim 10, wherein said linking means assigns the same color or numeral to said typical image and said segment that are linked together.

12. A clip display device according to claim 10, further comprising:

motion vector calculation means for extracting two sequential frames from a motion picture at a constant time interval in order to calculate a motion vector, wherein said linking means links said obtained motion vector with said segments of said graphic representation, and wherein said clip length ratio display means displays said motion vector in said segments of said graphic representation.

13. A clip display device according to claim 10, further comprising:

color data calculation means for extracting frames from a motion picture at a constant time interval in order to calculate data for the dominant color in each of said frames, wherein said linking means links said obtained color data to said segments of said graphic representation, and wherein said clip length ratio display means displays colors represented by said color data in said segments of said graphic representation.

14. A clip display device according to claim 10, further comprising:

differential value storage means for storing a differential value acquired between two sequential frames in order to divide a motion picture into clips, wherein said linking means employs said differential value to designate the shapes of border lines between said segments of said graphic representation, and wherein said clip length ratio display means displays said border lines having the designated shapes between said segments of said graphic representation.

15. A clip display device according to claim 10, further comprising:

maximum movement object extraction means for extracting two sequential frames from a motion picture at a constant time interval and calculating a motion vector therefrom to acquire an object that travels a maximum distance, wherein said linking means links said obtained objects with said segments of said graphic representation, and wherein said clip length ratio display means displays said objects in said segments of said graphic representation.

16. A clip display device according to claim 10, further comprising:

sound data acquisition means for extracting sound that is recorded with a motion picture at a constant time interval and for identifying a sound type, wherein said linking means links said sound type that is identified with said segments of said graphic representation, and wherein said clip length ratio display means displays graphic symbols representing said sound types in said segments of said graphic representation.

17. A clip display device according to claim 10, further comprising:

at least two of a motion vector calculation means for extracting at a constant time interval two sequential frames from a motion picture to calculate a motion vector, a color data calculation means for extracting at a constant time interval frames from a motion picture to calculate color data that are mainly included in said frames, a differential value storage means for storing a differential value between two sequential frames that is acquired to divide a motion picture into clips, a maximum movement object extraction means for extracting at a constant time interval two sequential frames from a motion picture and calculating a motion vector therefrom to acquire an object that travels the maximum distance, and a sound data acquisition means for extracting at a constant time interval sound that is recorded with images and for identifying sound types; and a selection means for selecting one or more of those means, wherein when said motion vector calculation means is selected, said linking means links said obtained motion vector with said segments of said graphic representation, and said clip length ratio display means displays said motion vector in said segments of said graphic representation, wherein when said color data calculation means is selected, said linking means links said obtained color data with said segments of said graphic representation, and said clip length ratio display means displays colors indicated by said color data in said segments of said graphic representation, wherein when said differential value storage means is selected, said linking means employs said differential value to designate shapes of border lines between said segments of said graphic representation, and said clip length ratio display means displays said border lines having the designated shapes between said segments of said graphic representation, wherein when said maximum movement object extraction means is selected, said linking means links said obtained objects with said segments of said graphic representation, and said clip length ratio display means displays said objects in said segments of said graphic representation, and wherein when said sound data acquisition means is selected, said linking means links said sound type that is identified with said segments of said graphic representation, and said clip length ratio display means displays graphic symbols representing said sound types in said segments of said graphic representation.

18. A clip display device according to claim 10, further comprising:

selection means for selecting a position in a typical image on or in said graphic representation of the overall length of a motion picture; and marking means for displaying a mark in a corresponding typical image when a segment of said graphic representation is selected, and for displaying a mark in a corresponding segment of the graphic representation in order to identify a typical image when a corresponding image is selected.

19. A clip display device according to claim 17, further comprising:

selection means for selecting a position in a typical image on or in said graphic representation of the overall length of a motion picture; and marking means for displaying a mark in a corresponding typical image when a segment of said graphic representation is selected, and for displaying a mark in a corresponding segment of the graphic representation in order to identify a typical image when a corresponding image is selected.

* * * * *